Figures 1, 2:
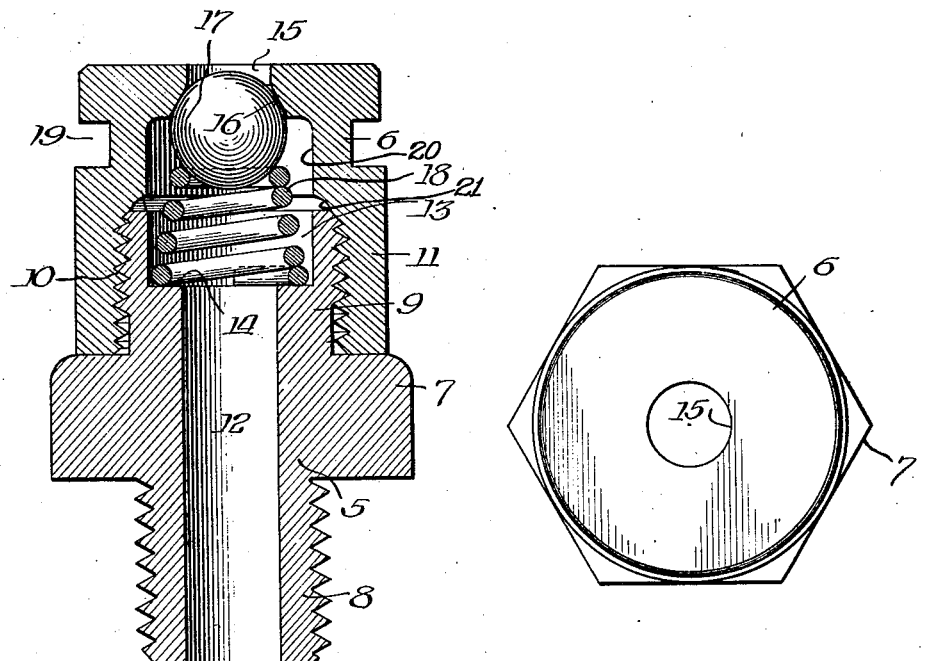

Oct. 24, 1933.   F. N. BARD   1,931,918
CHECK VALVE
Filed Aug. 20, 1926

Inventor:
Francis Norwood Bard
by attorney

Patented Oct. 24, 1933

UNITED STATES PATENT OFFICE 1,931,918

CHECK VALVE

Francis Norwood Bard, Highland Park, Ill., assignor to Walworth Patents Inc., Boston, Mass., a corporation of Massachusetts Application August 20, 1926. Serial No. 130,364

3 Claims. (Cl. 184—105)

This invention relates in general to valves and more particularly to improvements in check valves.

The invention as described and illustrated is particularly adapted to a check valve for use in connection with high pressure systems of lubrication, and forms a connection between a grease gun or the like and a bearing, the device of this invention being attached to the bearing or other element to be lubricated, though it will be understood that the invention finds a wide field of utility when employed for other purposes.

The principal objects and advantages of this invention reside in the provision of an improved form of check valve in which the resistance to movement of the valve from its seat is so proportioned that sticking of the valve is rendered impossible; the provision of an improved check valve in which the valve seat and the resilient member for seating the valve have such contact with the valve member that sticking of the valve on its seat is rendered impossible; the provision of an improved check valve in which the valve chamber housing the valve member and spring contains no projections on which lubricant can lodge and harden or the spring catch; the provision of an improved check valve including an improved construction of spring member; the provision of an improved check valve having means for adjusting the valve seat; the provision of an improved check valve having means for adjusting the tension of the valve seating resilient member; and the provision of a valve of the character described which is small in construction, compact and readily taken apart for cleaning and repair.

The foregoing and such other objects and advantages as may appear or be pointed out as this description proceeds are attained in the structural embodiment illustrated in the accompanying drawing in which:

Figure 1 is a vertical sectional view of a valve embodying the improvements of this invention, and Figure 2 is a plan view of the same.

Referring now more particularly to the drawing, I provide a housing which includes a body portion 5 and a cap or closure portion 6.

The body 5 is provided with an enlarged hexagonally shaped portion 7 and an externally threaded shank 8 whereby the body 5 may be screwed into a bearing or other element to receive lubrication.

The body 5 is also provided with a shank portion 9 extending oppositely from the shank portion 8 and externally threaded, as at 10, the internally threaded portion 11 of The cap fits snugly through its threa shank 9 and may be adjusted to a des tion thereon for a purpose which w presently.

The body is provided with a bore extends through the shanks 8 and 9 larged in the shank 9, as indicated provide an annular shoulder 14.

The cap 6 is provided with an inlet substantially circular and said opening to form an annular plain valve seat 16 a ball valve 17 is adapted to seat. Tl beyond the seat 16 is enlarged as at 2 ameter substantially equal to the di the enlargement 13 in the shank por junction between the enlargement 20 internally threaded portion of the cap a shoulder 21 which overlies the end of portion 10, and thus permits the cap n seat on the hexagonally-shaped flang The valve 17 is normally maintain seat 16 by a compression coil spring 18 substantially frusto-conical in genera and has its larger end resting on the 14 and its smaller outer end engaging face of the ball 17. The coil spring 1 erably formed of wire which is of a larger than the space between the sh and the end of the shank 10 so that tl the spring will not catch or lodge in to prevent free operation of the spring The external surface of the cap 6 ] outer end thereof is provided with ar groove 19 to afford means for receiving necting a grease gun, not shown.

The advantages of the structure of th invention reside more particularly in vision, in combination, of the plain valv ball valve 17, conical coil spring 18. rangement, coupled with the readily r features of the cap 6 to permit cleanir to eliminate possibility of jamming or of the valve. Considerable difficulty encountered by me in employing we' makes of check valves for use on lubric valves for introducing the lubricant, the fact that the valves now known t come clogged and stick and I have fo the ordinary helical spring hinders the of the lubricant into the bearing. By th invention the valve has a relatively sr face of contact with the seat and there not stick on the seat. It will be obser ne surface of the valve seat and the curved of the ball afford an annular tapered into which the lubricant or other fluid pressure is forced to tend to wedge the f its seat and thus facilitate opening to entrance. Furthermore, the tension of ing 18 may be adjusted by threading the o the desired point although in the usual ation the cap is screwed home as shown are 1.

convolutions of the spring 18, when com- d, allow a greater area of passageway rough than in the conventional form of spring, owing to the successive lateral ement of each convolution. Thus the 18 serves to facilitate the passage of heavy past the valve and into the bearing. are no projections in the parallel-sided chamber on which the spring may catch which lubricant may lodge and harden us clog the valve.

ing thus described my invention and illus- its use, what I claim as new and desire to by Letters Patent is:

1 a valve device, a body having a reduced ally threaded shank portion at one end, said eing provided with an axial bore, an exter- threaded shank at the other end of said ontaining an enlargement of said bore de- an internal annular shoulder, a cap mem- readedly engaging the last named shank ne terminal end seated on the body, said aving an opening therein of substantially me size as said enlargement and arranged n in conjunction therewith a plain cylindri- ve chamber, a frusto-conical valve seat ad- the other terminal end of said cap member xtending from said opening, a ball valve er adapted to engage said seat and being le both laterally and longitudinally in the hamber, and a spring having one end seat- the shoulder and the other end engaging all and urging it against its seat.

a a valve device, a body having a reduced ally threaded shank portion at one end, ody being provided with an axial bore, an ally threaded shank at the other end of said ontaining an enlargement of said bore de- fining an internal annular shoulder and an annular end face, a cap member having a threaded portion thereon engaging the last named shank with one end of said portion seating on the body and the other overlying the annular end face of the threaded shank but being spaced therefrom to insure said seating, said cap having an opening therein extending from the overlying end and being of substantially the same size as said enlargement and arranged to form in conjunction therewith a plain cylindrical valve chamber, a frusto-conical valve seat adjacent the other terminal end of said cap member and extending from said opening, a ball valve member adapted to engage said seat and being movable both laterally and longitudinally in the valve chamber, and a spring having one end seated on the shoulder and the other end engaging said ball and urging it against its seat.

3. In a valve device, a body having a reduced externally threaded shank portion at one end, said body being provided with an axial bore, an externally threaded shank at the other end of said body containing an enlargement of said bore defining an internal annular shoulder and an annular end face, a cap member having a threaded portion thereon engaging the last named shank with one end of said portion seating on the body and the other overlying the annular end face of the threaded shank but being spaced therefrom to insure said seating, said cap having an opening therein extending from the overlying end and being of substantially the same size as said enlargement and arranged to form in conjunction therewith a plain cylindrical valve chamber, a frusto-conical valve seat adjacent the other terminal end of said cap member and extending from said opening, a ball valve member adapted to engage said seat and being movable both laterally and longitudinally in the valve chamber and a helical coil spring having one end seated on the shoulder and the other end engaging the ball and urging it against its seat, said spring having a wire size larger than the space between the cap and the shank to prevent catching of the spring.

FRANCIS NORWOOD BARD.